United States Patent [19]

Duggal

[11] Patent Number: 5,161,754

[45] Date of Patent: Nov. 10, 1992

[54] SAFETY DEVICE FOR PRESSURE BOTTLE FIRING LANYARD

[75] Inventor: Virinder Duggal, Woodinville, Wash.

[73] Assignee: The Boeing Company, Seattle, Wash.

[21] Appl. No.: 722,647

[22] Filed: Jun. 28, 1991

[51] Int. Cl.$^5$ .............................................. B64D 25/14
[52] U.S. Cl. .................... 244/137.2; 244/905; 193/25 B
[58] Field of Search .................. 244/137.2, 905, 137.4, 244/146; 193/25 B

[56] References Cited

U.S. PATENT DOCUMENTS

| | | | |
|---|---|---|---|
| 3,973,744 | 8/1976 | Hintzman | 244/905 X |
| 4,031,583 | 6/1977 | Phillips, II | 244/905 X |
| 4,715,562 | 12/1987 | Bokalot | 244/905 X |

FOREIGN PATENT DOCUMENTS 0081845 6/1983 European Pat. Off. ........ 244/905 X

*Primary Examiner*—Charles A. Marmor
*Assistant Examiner*—Carla Mattix
*Attorney, Agent, or Firm*—Conrad O. Gardner; B. A. Donahue

[57] ABSTRACT

A safety device for an aircraft inflatable escape slide which functions to prevent inadvertent inflation of the slide during shipping. The safety device incorporates a rotatable hook means which retains the firing lanyard in a fixed position and is adapted to release the firing lanyard when the slide pack covers are leased. A pair of swaged ball elements are provided on the lanyard, one on either side of the hook means.

3 Claims, 2 Drawing Sheets

SAFETY DEVICE FOR PRESSURE BOTTLE FIRING LANYARD

BACKGROUND OF THE INVENTION

1. Field of the Invention

This invention relates to a pressure firing lanyard for releasing stored gas from pressure vessels utilized to inflate aircraft escape slides More particularly this invention relates to a safety device which functions to prevent inadvertent inflation of the slide during shipping and handling.

2. Description of the Prior Art

Exemplary of the prior art literature including lanyard activated pressurizing systems are U.S. Pat. Nos. 2,949,274; 3,113,327; 3,165,763; 3,709,044; 3,782,413; 3,809,288; 4,416,393; 4,627,823; and U.S. Pat. No. 4,767,371. In contrast the present lanyard activated pressurizing system is adapted to be released when the slide pack covers are released.

It is an object of the present invention to prevent inadvertent inflation of an inflatable escape slide by preventing a firing lanyard from being pulled prior to actuation of the present safety device associated with the shaft which rotates to release the pack covers.

It is yet another object of the invention to provide a safety device disposed on the packboard of a slide or slide/raft unit for retaining a pressure bottle firing lanyard in a fixed position until the slide or slide/raft covers are released.

SUMMARY OF THE INVENTION

The present invention comprises a safety device in a packboard of an aircraft escape slide which utilizes rotatable hook structure attached to the shaft assembly which rotates to release the pack covers A pair of swaged ball elements are provided on the pressure bottle firing lanyard, one on either side of the hook structure Upon rotation of the shaft for releasing the pack covers, the hook structure also rotates away from between the swaged ball elements to release the pressure bottle firing lanyard from its fixed position.

BRIEF DESCRIPTION OF THE DRAWINGS

For a better understanding of the nature and objects of the invention, reference should be made to the following detailed description taken in connection with the accompanying drawings in which.

DETAILED DESCRIPTION OF THE PREFERRED EMBODIMENT

Figure 1:
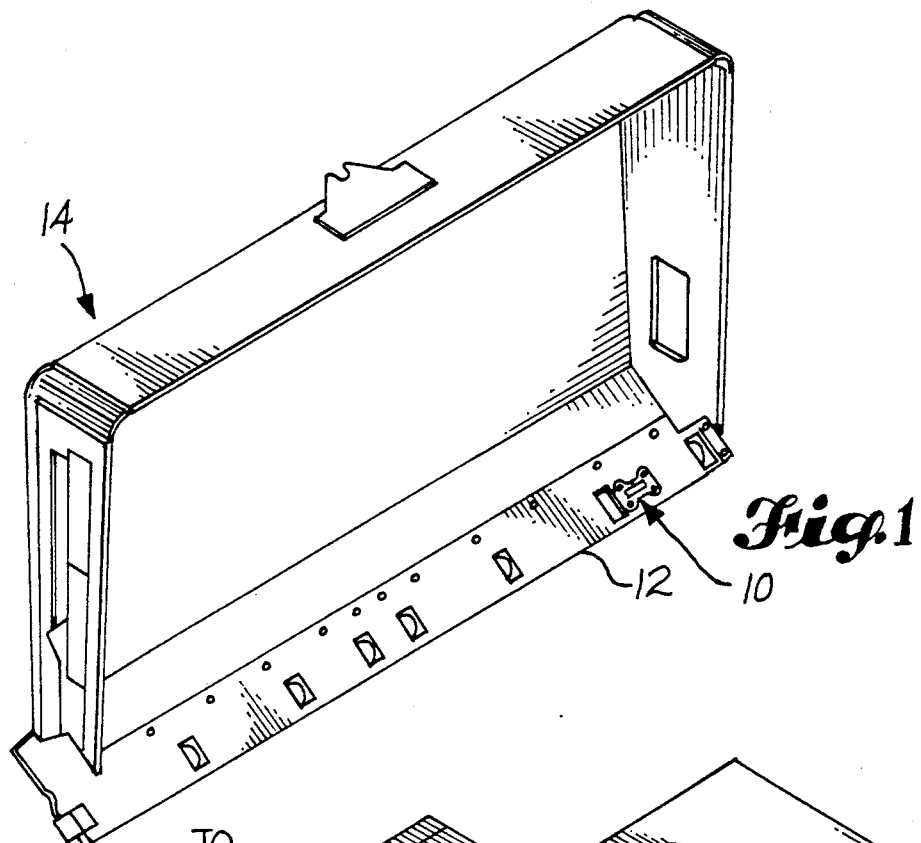
FIG. 1 is an isometric perspective view showing location of the present safety device for pressure bottle firing lanyard on the backboard of an aircraft escape slide.

Turning now to FIG. 1, it can be seen that the present safety device for pressure bottle firing lanyard 10 is located on the bottom edge 12 of packboard 14. In FIGS. 2 through 5, cut-out plate 25 having a generally oval shaped aperture 26 is seen disposed over corresponding aperture 27 (see FIG. 4) in bottom edge 12 of packboard 14.

Rotatable hook member 30 (seen in FIGS. 3, 4, and 5) is attached to shaft 32 which rotates in the direction seen (by arrow 36 in FIG. 3) to release the pack covers.

Figure 2:
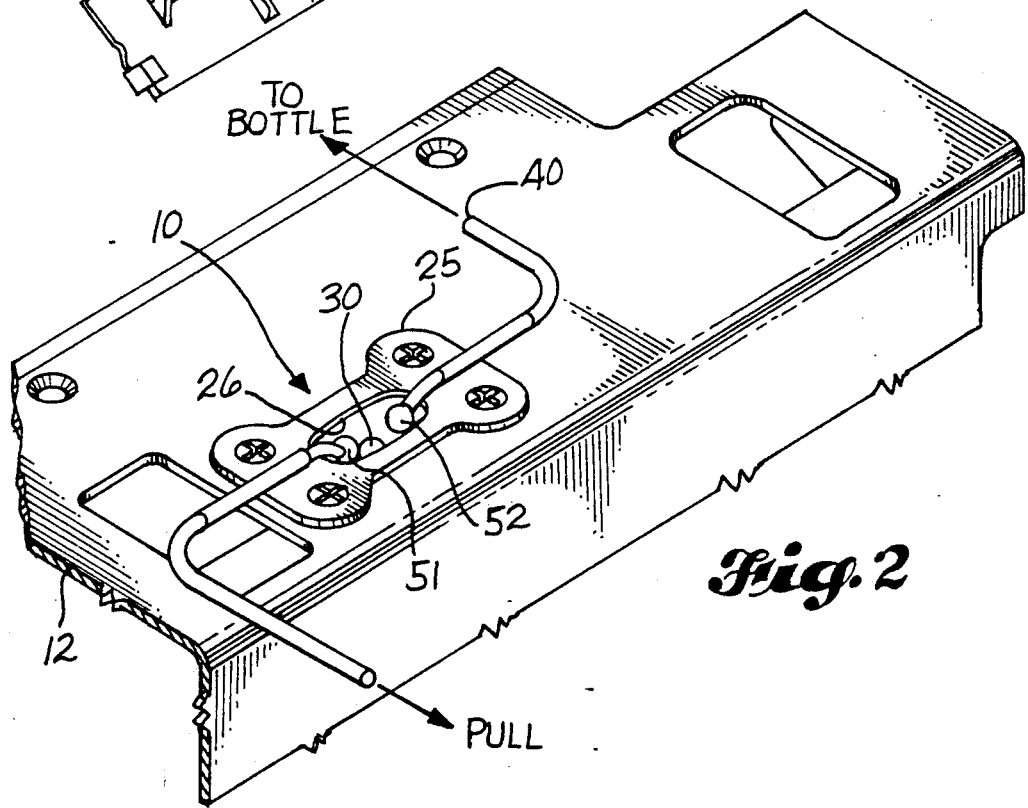
FIG. 2 is an enlarged perspective view showing in more detail the safety device of FIG. 1.
Figure 3:
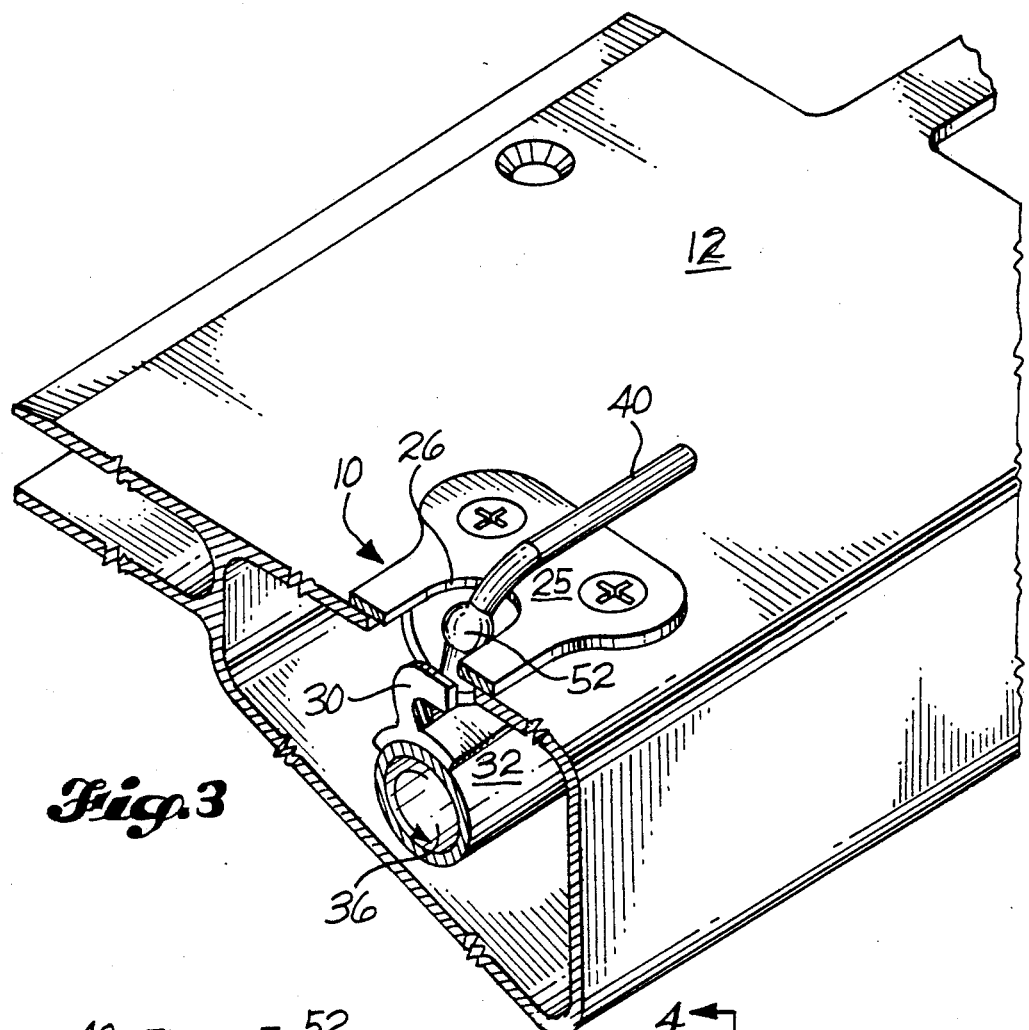
FIG. 3 is a perspective view with partial cutaway showing a shaft portion of the pack cover release mechanism in the latched position with safety device enabled by the hook structure disposed between the swaged ball elements.
Figure 4:
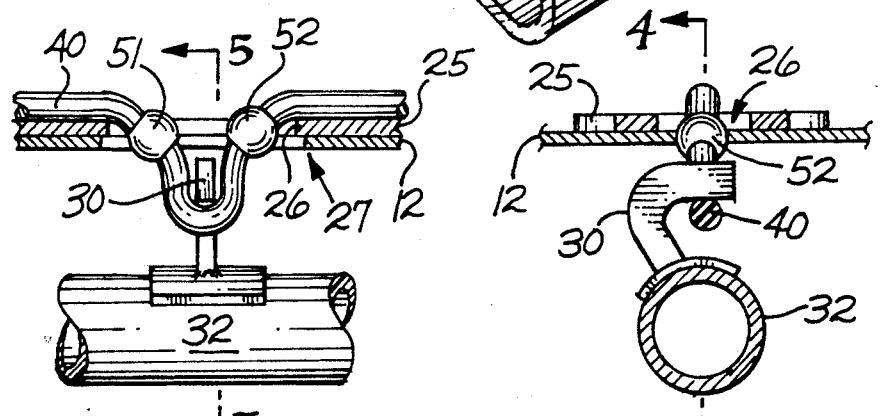
FIG. 4 is a sectional view taken along the lines 4—4 of FIG. 5 showing the hook structure passing over the pressure bottle firing lanyard between the swaged ball elements on the lanyard; and, FIG. 5 is a sectional view taken along the lines 5—5 of FIG. 4 showing the hook structure attached to the shaft portion of the pack cover release mechanism prior to rotation of the shaft and hook structure for release of the lanyard.
Figure 5:
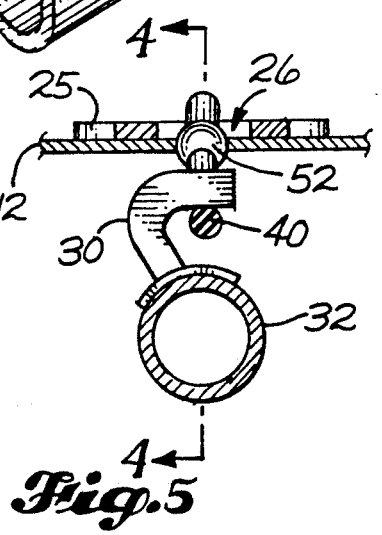

Pressure bottle firing lanyard 40 carries a pair of swaged ball elements 51 and 52 (as seen in FIGS. 2 and 4) attached thereto. As seen best in FIGS. 2 and 4, pressure bottle firing lanyard 40 is positioned inside cut-out plate 25 so that rotatable hook member 30 goes over pressure bottle firing lanyard 40 with swaged ball elements 51 and 52 disposed on opposite sides of rotatable hook member 30. When shaft 32 rotates (as seen in FIG. 3) from the latched position in the direction of arrow 36 to release the pack covers, pressure bottle firing lanyard 40 is also released from its safe locked position since rotatable hook member 30 also rotates with shaft 32 away from its position as shown disposed between swaged ball elements 51 and 52. Thereafter, pressure bottle firing lanyard 40 can be pulled safely to inflate the slide (not shown) Thus, it can be seen that in accordance with the preferred embodiment of the present invention herein described and illustrated, pulling (as seen in FIG. 2) of a bottle firing lanyard 40 accidentally (as during shipment) will not cause inadvertent inflation of the unit and consequent torn slide or broken packboard since shaft 32 must first be rotated to release the pack covers and also simultaneously the pressure bottle firing lanyard

What is claimed is:

1. In combination:
   a on:
   an aircraft slide;
   aircraft slide pack covers;
   a bottle firing lanyard for inflating said aircraft slide;
   a rotatable hook member for retaining said bottle firing lanyard for inflating said aircraft slide in a fixed position and further adapted to release said bottle firing lanyard when said aircraft slide pack covers are released 2. The combination according to claim 1 wherein said bottle firing lanyard for inflating said aircraft slide includes a pair of swaged ball elements disposed on either side of said rotatable hook member 3. The combination according to claim 1 wherein said rotatable hook member is attached to a rotatable shaft for releasing said slide pack covers.

* * * * *

UNITED STATES PATENT AND TRADEMARK OFFICE
CERTIFICATE OF CORRECTION

PATENT NO. : 5,161,754
DATED : Nov. 10, 1992
INVENTOR(S) : Duggal, Virinder

It is certified that error appears in the above-indentified patent and that said Letters Patent is hereby corrected as shown below:

Column 2:

In Claim 1

Line 2

Delete -- a on: --

Signed and Sealed this

Twenty-fifth Day of January, 1994

*Attest:*

BRUCE LEHMAN

*Attesting Officer*     *Commissioner of Patents and Trademarks*